(12) United States Patent
Romig

(10) Patent No.: US 6,456,925 B1
(45) Date of Patent: Sep. 24, 2002

(54) VEHICLE DRIVEN WHEEL SPEED CONTROL SYSTEM

(75) Inventor: Bernard Edwin Romig, Illinois City, IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/659,250

(22) Filed: Sep. 11, 2000

(51) Int. Cl.⁷ .................................................. G06F 7/00
(52) U.S. Cl. ............................. 701/93; 701/41; 701/70; 701/110
(58) Field of Search ............................. 701/41, 70, 72, 701/79, 93, 110; 56/14.8

(56) References Cited

U.S. PATENT DOCUMENTS

| | | | |
|---|---|---|---|
| 4,354,568 A | | 10/1982 | Griesenbrock .............. 180/197 |
| 5,294,871 A | * | 3/1994 | Imaseki |
| 5,805,449 A | * | 9/1998 | Ito ............................... 701/41 |
| 5,921,335 A | * | 7/1999 | Straetker |
| 5,931,881 A | * | 8/1999 | Gustin et al. .................. 701/41 |

FOREIGN PATENT DOCUMENTS

| | | |
|---|---|---|
| DE | 41 33 969 A1 | 4/1993 |
| FR | 1 038 617 | 9/1953 |

OTHER PUBLICATIONS

Chicurel, "A 180° steering interval mechanism", Mechanism and Machine Theory 34, 1997.

* cited by examiner

Primary Examiner—Gertrude Arthur

(57) ABSTRACT

A control system controls the speed of the driven wheels of a vehicle having an operator controlled steering wheel, an operator controlled speed command device, steerable wheels and driven wheels. The control system includes a steering angle sensor coupled to the steering input member and generating a steering angle signal, a speed command sensor coupled to the speed command device and generating a speed command signal, and a control unit. The control unit generates driven wheel speed command signals as a function of the steering angle signal, a wheelbase of the vehicle, a distance between the driven wheels, and the speed command signal. The magnitude of the speed command signal is limited to a calculated limit value which is a function of the wheelbase of the vehicle, a distance from a driven wheel axle of the vehicle forward to a center of gravity of the vehicle, a value representing a maximum allowable centripetal acceleration, and the steering angle signal.

14 Claims, 5 Drawing Sheets

VEHICLE DRIVEN WHEEL SPEED CONTROL SYSTEM

BACKGROUND OF THE INVENTION

The invention relates to a control system for controlling the driven wheel speeds of a vehicle with steerable wheels and independently driven wheels.

Zero turn radius vehicles, such as lawn mowers and windrowers, have relied on caster wheels and some form of independent control of the drive wheels for steering. Such designs can result in poor directional control when traversing side slopes and can limit the usability of the vehicle. Certain known Ackerman-type steering linkages with 180 degrees of wheel turning capability have been unduly complicated and have included exposed gears. A steering mechanism for a front wheel drive vehicle is shown in the article "A 180° steering interval mechanism" by E. Chicurel in "Mechanism and Machine Theory" Vol. 34, No. 3, April 1999. However, this article does not disclose how driven wheel speed could be controlled to achieve a zero turn radius.

SUMMARY OF THE INVENTION

Accordingly, an object of this invention is to provide a driven wheel drive speed control system for a vehicle with steerable wheels and independently driven wheels.

A further object of the invention is to provide such a system which results in a constant travel speed of a center of the steerable wheel axle.

Another object of the invention is to provide such a system which reduces the chances of vehicle tipping during a turn.

Another object of the invention is to provide such a system for use with a vehicle with zero turn radius capability.

These and other objects are achieved by the present invention, wherein a control system controls the speed of the driven wheels of a vehicle having an operator controlled steering wheel, an operator controlled speed command device, steerable wheels and driven wheels. The control system includes a steering angle sensor coupled to the steering input member and generating a steering angle signal, a speed command sensor coupled to the speed command device and generating a speed command signal, and a control unit. The control unit generates driven wheel speed command signals as a function of the steering angle signal, a wheelbase of the vehicle, a distance between the driven wheels, and the speed command signal. The magnitude of the speed command signal is limited to a calculated limit value which is a function of the wheelbase of the vehicle, a distance from a driven wheel axle of the vehicle forward to a center of gravity of the vehicle, a value representing a maximum allowable centripetal acceleration, and the steering angle signal. The control system automatically reduces speed when the vehicle enters a sharp turn, thus reducing the chances of lateral tipping without compromising either travel speed or turning radius. This control system can be used with vehicles with zero turn radius capability, since the driven wheel speed command signals are determined by calculations which do not require dividing by a turn radius value.

DETAILED DESCRIPTION

Figure 1:
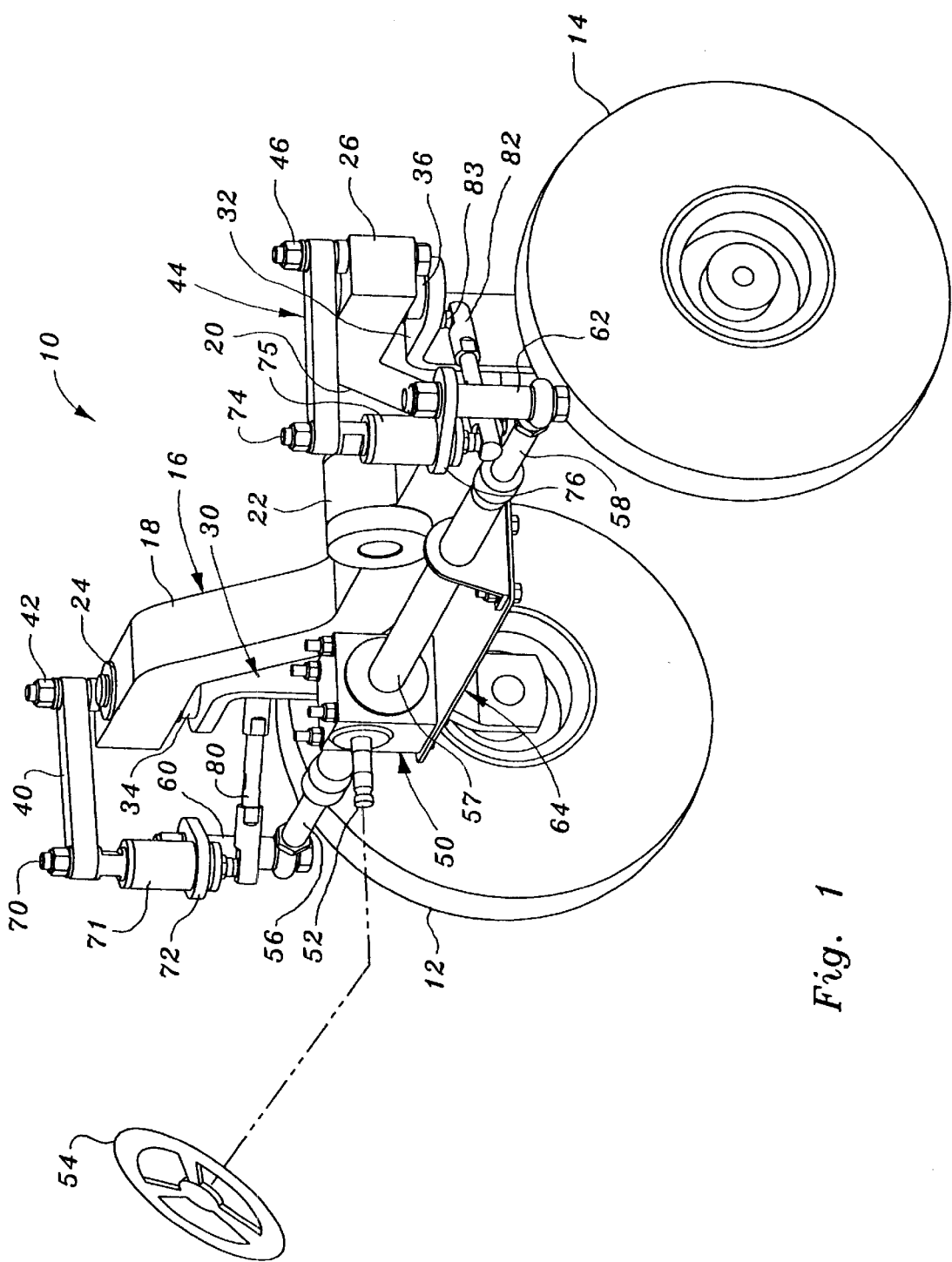
FIG. 1 is a perspective view of a steering assembly according to the present invention.
Figure 2:
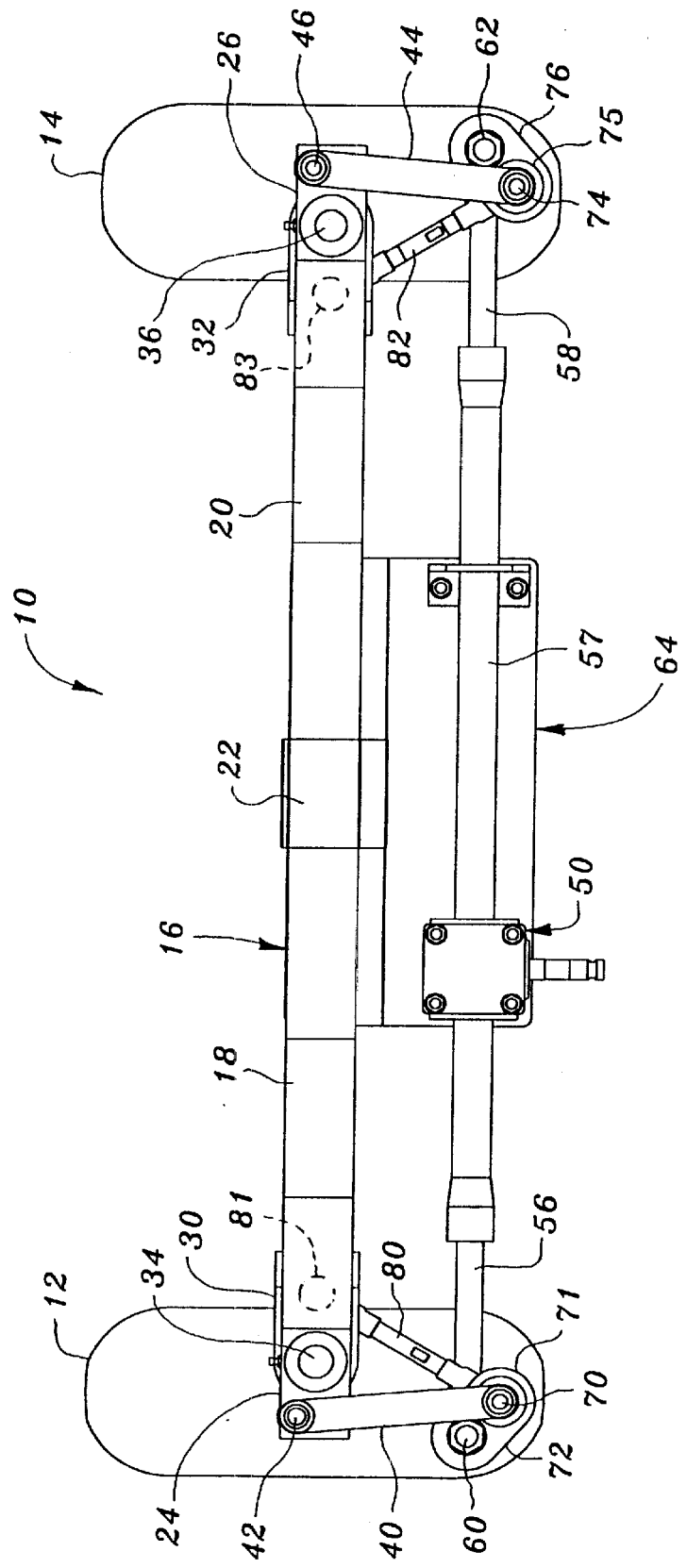
FIG. 2 is a top view of the steering assembly of FIG. 1.
Figure 3:
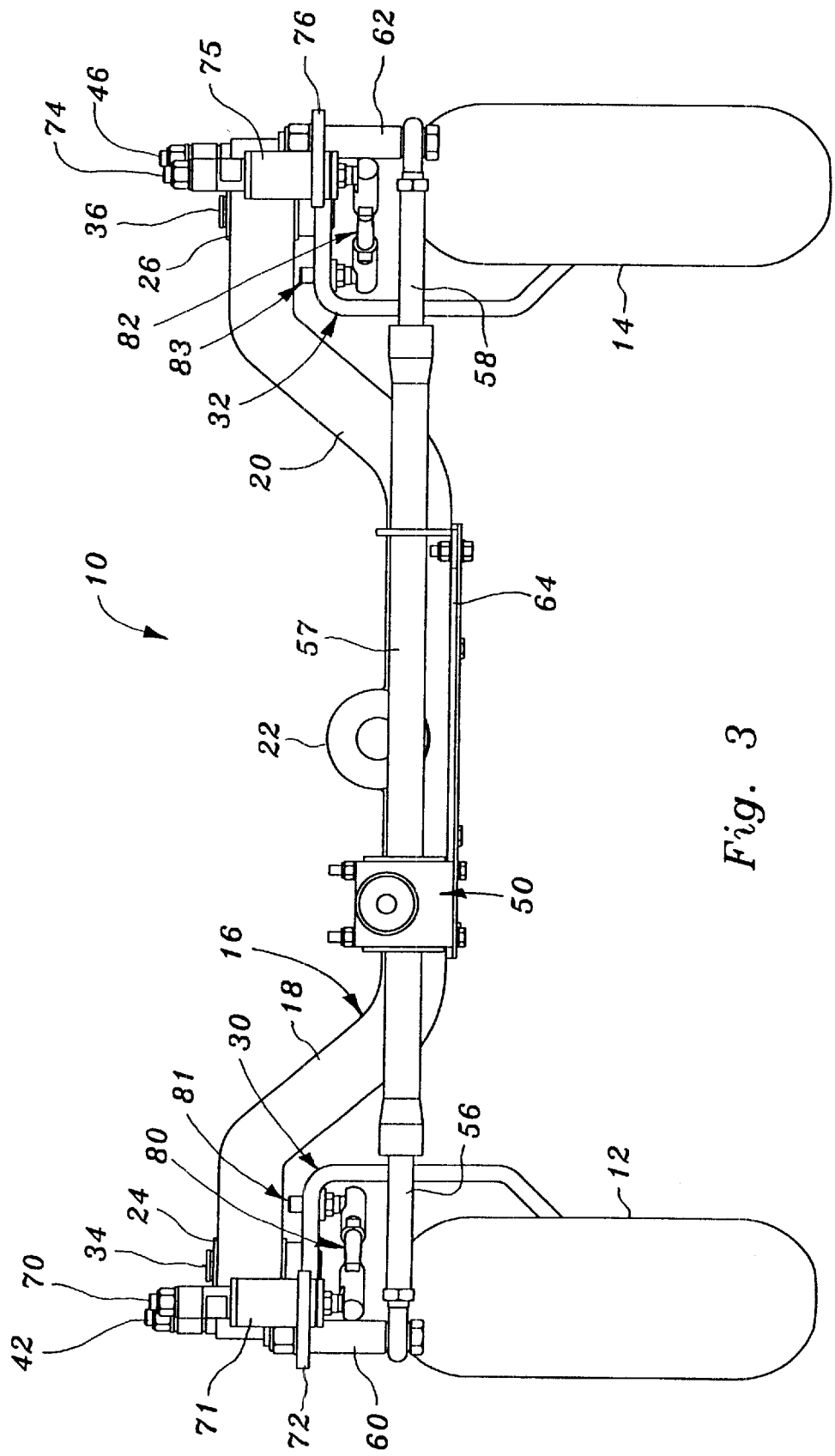
FIG. 3 is an end view, from rear to front, of the steering assembly of FIG. 1.

Referring to FIGS. 1–3, a steering assembly 10 is provided for the steerable wheels 12 and 14 of a vehicle, such as a lawn mower, windrower, etc. The assembly 10 includes an axle beam 16 which has a left arm 18 and a right arm 20 which project outwardly from a center pivot member 22 which is pivotal about a central fore-and-aft extending axis.

The left and right steerable wheels 12,14 are rotatably coupled to the lower ends of respective, generally C-shaped, left and right half fork members 30 and 32. Each half fork member has a pivot pin 34, 36 which projects upwardly from an upper end thereto. Pin 34 is pivotally received in a bore in the outer end 24 of left arm 18. Pin 36 is pivotally received in a bore in the outer end 26 of right arm 20.

A left rocker arm 40 is pivotal about a pivot pin 42 which is fixedly mounted in a bore in the outer end 24 of left arm 18, and positioned forward and laterally outwardly with respect to pin 34. A right rocker arm 44 is pivotal about a pivot pin 46 which is fixed in a bore in the outer end 26 of right arm 20, and positioned forward and laterally outwardly with respect to pin 36.

A conventional rack and pinion assembly 50 is attached to the axle beam 16 and includes a steering input shaft 52 which is coupled to a steering wheel 54 of the vehicle. A rack member (not shown) is slidable in a fixed housing 57 and has left and right rack end members 56 and 58 which project laterally outwardly from opposite ends of the housing 57. A left vertical pivot pin 60 has a lower end which is pivotally attached to the left end 56 of the rack member, and a right vertical pivot pin 62 has a lower end which is pivotally attached to the right end 58 of the rack member. A support bracket 64 supports the rack housing 57 and is attached to the axle beam 16.

Left rocker arm 40 is fixed to an upper end of a pivot pin 70 which pivotally supports, via bushings (not shown), a sleeve 71 which is fixed to an end of pivot link 72. Right rocker arm 44 is fixed to an upper end of a pivot pin 74 which pivotally supports, via bushings (not shown), a sleeve 75 which is fixed to an end of a pivot link or tie rod member 76. The upper end of left vertical pivot pin 60 is fixed to the other end of pivot link 72. The upper end of vertical pivot pin 62 is fixed to the other end of pivot link or tie rod member 76.

A left connecting rod 80 has one end pivotally coupled to the lower end of pin 70 via a ball joint (not shown) and another end pivotally coupled to the upper end of left half fork member 30 by pin 81. A right connecting rod 82 has one end pivotally coupled to the lower end of pin 74 via a ball joint (not shown) and another end pivotally coupled to the upper end of right half fork member 32 by pin 83. As best seen in FIG. 3, each of the pins 81, 83 is inboard with respect to the corresponding one of pivot pins 34, 36.

As best seen in FIG. 2, when the wheels 12, 14 are oriented straight ahead, pin 70 is inboard and to the rear of pin 60, and pin 74 is inboard and to the rear of pin 62.

Figure 4:
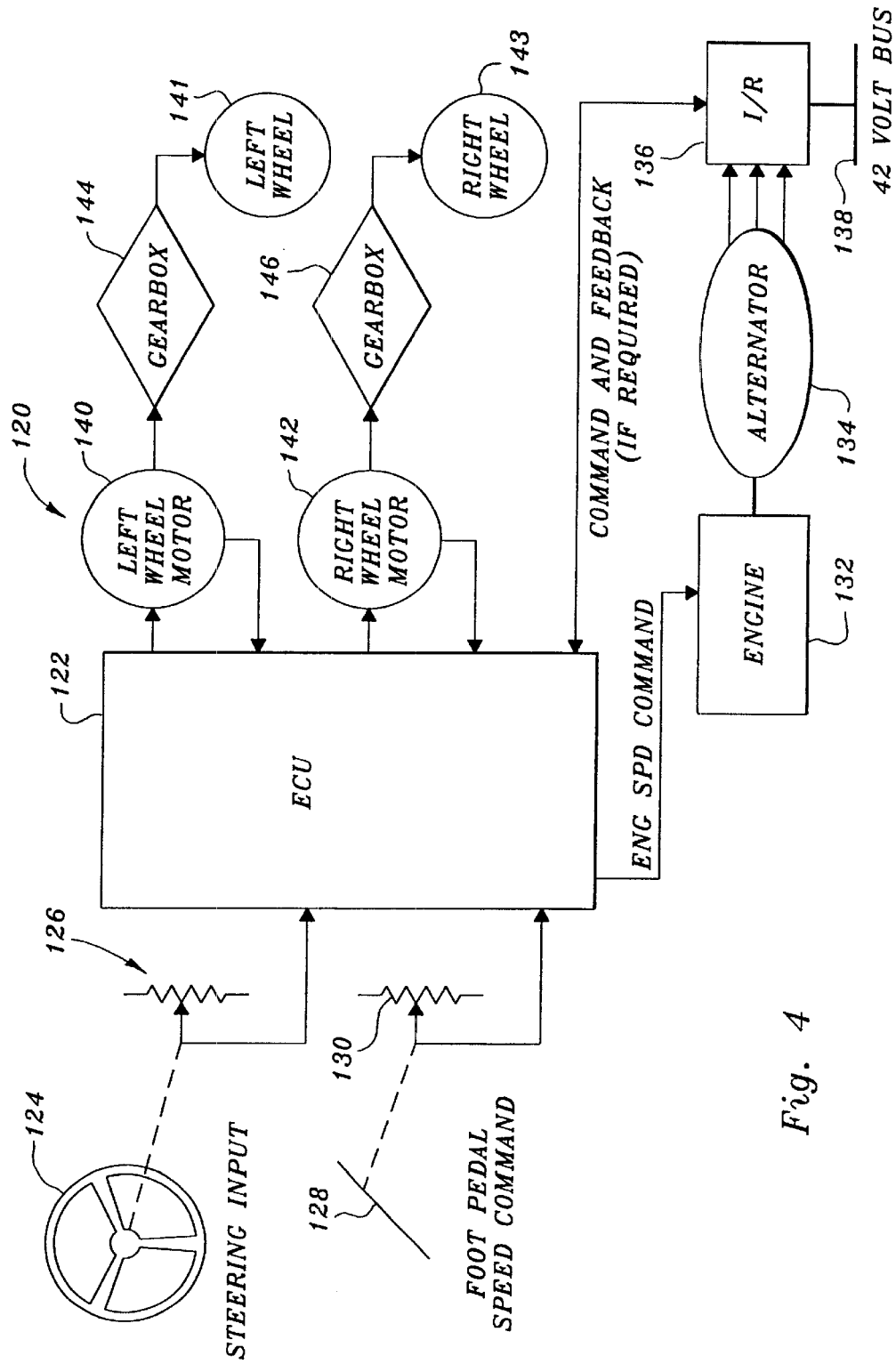
FIG. 4 is a schematic diagram of a control system for controlling the driven wheels of a vehicle with the steering assembly of FIG. 1.

Referring now to FIG. 4, the control system 120 includes a microprocessor-based electronic control unit (ECU) 122 which receives operator controlled signals, including a commanded steering angle signal from a steering wheel 124 via steering wheel transducer 126, and a speed command signal from a foot pedal 128 via foot pedal transducer 130. ECU 122 supplies an engine speed command to an internal combustion engine 132. Engine 132 drives an alternator 134 which supplies power to an inverter/rectifier 136 which feeds DC power to a DC bus 138. Left and right driven wheel drive motors 140 and 142 receive power from the bus 138 and receive control signals from ECU 122. Motor 140 drives left drive wheel 141 via a gearbox 144, and motor 142 drives right drive wheel 143 via a gearbox 146. The commanded steering angle is the angle through which a hypothetical center front wheel would need to be turned to cause a tricycle to follow the same turning radius. Preferably, the displacement of the rack (not shown) of steering assembly 10 is also made proportional to this value.

Figure 5:
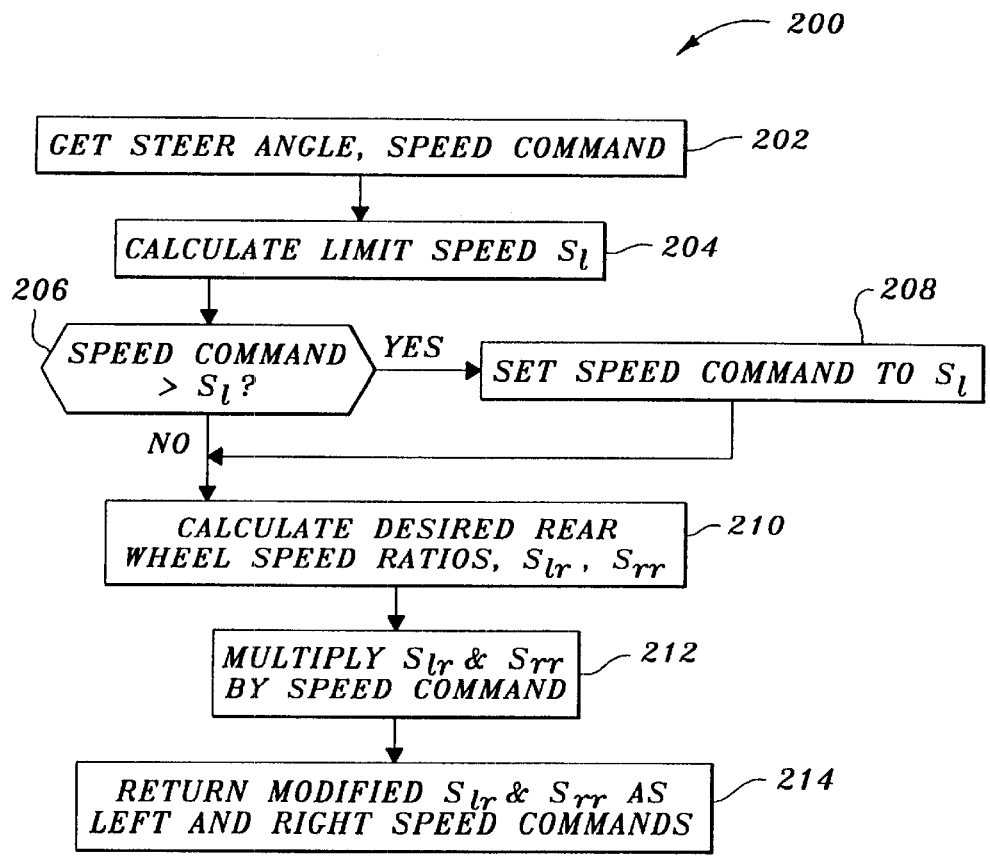
FIG. 5 is a logic flow diagram of an algorithm executed by the control system of FIG. 4.

The ECU 122 executes an algorithm 200 shown in FIG. 5. The conversion of the above flow chart into a standard language for implementing the algorithm described by the flow chart in a digital computer or microprocessor, will be evident to one with ordinary skill in the art. Step 202 gets the current values of the steer angle from transducer 126, and the speed command from transducer 130.

Step 204 calculates a limit speed, $S_l$, according to the following equation:

$$S_l = \frac{\sqrt{A_{max}W^2(1+\cot^2|\theta_s|)}}{\sqrt[4]{Y_{cg}^2 + W^2\cot^2|\theta_s|}}$$

where W is the wheelbase of the vehicle, $Y_{cg}$ is the distance from driven wheel axle (not shown) forward to center of gravity (not shown) of the vehicle, $A_{max}$ is a value representing a desired maximum allowable centripetal acceleration of the vehicle, and $\theta_s$ is the steering angle from transducer 126, where zero is straight ahead and a positive value represents a counterclockwise rotation of the front wheels 12, 14 when looking down on the vehicle.

$A_{max}$ is preferably determined as a function of the particular characteristics of the vehicle, such as its weight and shape, and is chosen so as to reduce the chances of the vehicle tipping over during too fast of a turn and so as to provide sufficient operator comfort.

Step 206 compares the speed command from transducer 130 to $S_l$ and step 208 sets the speed command to $S_l$ if the speed command is greater than $S_l$.

Next, step 210 calculates a desired left driven wheel speed ratio value $S_{lr}$ and a desired right driven wheel speed ratio value $S_{rr}$, according to the following equations:

$$S_{lr} = \cos\theta_s - \frac{T_r \sin\theta_s}{2W}$$

$$S_{rr} = \cos\theta_s + \frac{T_r \sin\theta_s}{2W}$$

where $T_r$ is the driven wheel tread, or the distance between the centerlines of the driven wheels.

Step 212 calculates the left and right speed commands by multiplying $S_{lr}$ and $S_{rr}$ by the speed command from sensor 130.

Finally, step 214 returns the speed commands from step 212 to the ECU 122 so that the motors 140 and 142 can be controlled accordingly. Thus, as a result of steps 202–214, the driven wheel speeds are calculated as a function of the steering angle and the desired speed, and not as a function of a turn radius value. This avoids dividing by zero in the event of a zero-radius turn.

The control system also calculates a maximum or limit speed which does not exceed a set centripetal acceleration value as a function of steering angle. This limit speed will be applied to the speed command generated by the foot pedal, forcing a reduction in speed as the steering is deflected. The resulting control system retains the feel of a conventional Ackerman steered vehicle with a driven wheel axle differential, but will limit the straight ahead speed to a value less than that corresponding to a maximum electric motor rpm.

With this control system a constant speed at the center of the front axle can be maintained, and simple computations are used to calculate the driven wheel velocities as a function of the commanded steering angle. In addition, the control system can automatically reduce vehicle speed when the vehicle enters sharp turns. This system is applicable to a wide range of vehicles of all sizes, such as combines, windrowers, larger agricultural tractors, loader backhoes, lawn tractors and commercial turf care equipment. This control system, together with the steering assembly, provides directional stability on side slopes.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A vehicle having an operator controlled steering input member, an operator controlled speed command device, steerable wheels and driven wheels, and a control system for controlling speeds of the driven wheels, the control system comprising:

a steering angle sensor coupled to the steering input member and generating a steering angle signal;

a speed command sensor coupled to the speed command device and generating a speed command signal; and a control unit for generating driven wheel speed command signals as a function of the steering angle signal, a wheelbase of the vehicle, a distance between the driven wheels, and the speed command signal.

2. The control system of claim 1, wherein:

a magnitude of the speed command signal is limited to a calculated limit value.

3. The control system of claim 2, wherein:

the calculated limit value is a function of the wheelbase of the vehicle, a distance from a driven wheel axle of the vehicle forward to a center of gravity of the vehicle, a value representing a maximum allowable centripetal acceleration, and the steering angle signal.

4. The control system of claim 3, wherein:

the limit value, $S_l$, is calculated according to the equation:

$$S_l = \frac{\sqrt{A_{max}W^2(1+\cot^2|\theta_s|)}}{\sqrt[4]{Y_{cg}^2 + W^2\cot^2|\theta_s|}}$$

where W is the wheelbase of the vehicle, $Y_{cg}$ is the distance from the driven wheel axle to the center of gravity of the vehicle, $A_{max}$ is the value representing the desired maximum allowable centripetal acceleration of the vehicle, and $\theta_s$ is the steering angle signal.

5. The control system of claim 3, wherein:
$A_{max}$ is determined as a function of vehicle weight and shape so as to reduce the chances of vehicle tipping over during a turn.

6. The control system of claim 1, wherein:
a magnitude of the speed command signal is limited to a calculated limit value which is a function of a value representing a maximum allowable centripetal acceleration of the vehicle.

7. The control system of claim 1, wherein:
the left driven wheel speed command signal is a function of a left driven wheel speed ratio value, $S_{lr}$, which is calculated according to the equation:

$$S_{lr} = \cos\theta_s - \frac{T_r \sin\theta_s}{2W}$$

where $T_r$ is a distance between centerlines of the driven wheels, W is the wheelbase of the vehicle, and $\theta_s$ is the steering angle signal.

8. The control system of claim 1, wherein:
the right driven wheel speed command signal is a function of a right driven wheel speed ratio value, $S_{rr}$, which is calculated according to the equation:

$$S_{rr} = \cos\theta_s + \frac{T_r \sin\theta_s}{2W}$$

where $T_r$ is a distance between centerlines of the driven wheels, W is the wheelbase of the vehicle, and $\theta_s$ is the steering angle signal.

9. The control system of claim 1, wherein:
the vehicle includes a steering assembly capable of rotating the steerable wheels through a 180 degree range.

10. A vehicle having an operator controlled steering input member, an operator controlled speed command device, steerable wheels and driven wheels, and a control system for controlling speeds of the driven wheels, the control system comprising:

a steering angle sensor coupled to the steering input member and generating a steering angle signal;

a speed command sensor coupled to the speed command device and generating a speed command signal; and a control unit responsive to the steering angle signal and to the speed command signal, and automatically reducing vehicle speed when the vehicle is turning.

11. The control system of claim 10, wherein:
the control unit generates driven wheel speed command signals as a function of a distance between centerlines of the driven wheels, a wheelbase of the vehicle, and the steering angle signal.

12. The control system of claim 11, wherein:
a magnitude of the speed command signals is limited to a calculated limit value.

13. The control system of claim 12, wherein:
the calculated limit value is a function of the wheelbase of the vehicle, a distance from a driven wheel axle of the vehicle forward to a center of gravity of the vehicle, a value representing a maximum allowable centripetal acceleration of the vehicle, and the steering angle signal.

14. The control system of claim 12, wherein:
the limit value is calculated according to the equation:

$$S_l = \frac{\sqrt{A_{max} W^2 (1 + \cot^2|\theta_s|)}}{\sqrt[4]{Y_{cg}^2 + W^2 \cot^2|\theta_s|}}$$

where W is the wheelbase of the vehicle, $Y_{cg}$ is the distance from the driven wheel axle to the center of gravity of the vehicle, $A_{max}$ is the value representing the desired maximum allowable centripetal acceleration of the vehicle, and $\theta_s$ is the steering angle signal.

\* \* \* \* \*